US008204494B2

(12) United States Patent
Weinzierl

(10) Patent No.: US 8,204,494 B2
(45) Date of Patent: Jun. 19, 2012

(54) CONTROLLING THE USE OF A WIRELESS MOBILE COMMUNICATION DEVICE

(75) Inventor: Mark A. Weinzierl, Frisco, TX (US)

(73) Assignee: Enfora, L.P., Plano, TX (US)

( * ) Notice: Subject to any disclaimer, the term of this patent is extended or adjusted under 35 U.S.C. 154(b) by 0 days.

(21) Appl. No.: 12/568,536

(22) Filed: Sep. 28, 2009

(65) Prior Publication Data

US 2010/0151849 A1 Jun. 17, 2010

Related U.S. Application Data

(63) Continuation of application No. 10/962,158, filed on Oct. 8, 2004, now abandoned.

(60) Provisional application No. 60/510,705, filed on Oct. 10, 2003.

(51) Int. Cl.
*H04M 3/00* (2006.01)

(52) U.S. Cl. ......... 455/419; 455/405; 455/418; 455/420

(58) Field of Classification Search .................. 455/405, 455/410, 411, 414.1, 418–420, 466, 517–519, 455/565, 566; 379/207.02, 207.03, 210.02, 379/88.19, 111, 114.17, 201.01; 709/203, 709/204, 206, 208, 209, 217, 219, 220, 227, 709/228

See application file for complete search history.

(56) References Cited

U.S. PATENT DOCUMENTS

| 4,908,848 A | 3/1990 | Hanawa |
| 4,945,556 A | 7/1990 | Namekawa |
| 5,046,125 A | 9/1991 | Takizawa |
| 5,325,418 A | 6/1994 | McGregor et al. |
| 5,600,708 A | 2/1997 | Meche et al. |
| 5,625,669 A | 4/1997 | McGregor et al. |
| 5,887,259 A | 3/1999 | Zicker et al. |
| 6,032,044 A | 2/2000 | Shannon et al. |
| 6,073,010 A | 6/2000 | Dufour |
| 6,243,574 B1 | 6/2001 | McGregor et al. |
| 6,674,403 B2 | 1/2004 | Gray et al. |
| 6,785,387 B1 | 8/2004 | Albrecht et al. |
| 6,799,052 B2 | 9/2004 | Agness et al. |
| 6,801,765 B1 | 10/2004 | Roo et al. |
| 6,826,762 B2 | 11/2004 | Shell et al. |

(Continued)

FOREIGN PATENT DOCUMENTS

WO  WO 02/19682 A1  3/2002

OTHER PUBLICATIONS

Supplemental European Search Report issued by the European Patent Office on Jun. 10, 2010 in connection with European Application No. 04794663.7.

*Primary Examiner* — Anthony Addy

(57) ABSTRACT

A controlling party can set limitations on a controlled party's access to applications operating on the controlled party's wireless mobile communication device. The controlling party can effectuate these limitations via various different mechanisms. In one instance, the controlling party uses another wireless communication device to effectuate the limitations. In another instance, the limitations are effectuated by the controlling party's operation of a data processing apparatus connected by a wired data communication bus to the controlled party's wireless mobile communication device. In a still further instance, the controlling party effectuates the limitations by accessing a website supported by a web server.

28 Claims, 5 Drawing Sheets

U.S. PATENT DOCUMENTS

| | | | |
|---|---|---|---|
| 7,155,001 B2 * | 12/2006 | Tiliks et al. | 379/196 |
| 7,197,321 B2 * | 3/2007 | Erskine et al. | 455/456.1 |
| 7,218,912 B2 | 5/2007 | Erskine et al. | |
| 7,277,726 B2 | 10/2007 | Ahya et al. | |
| 7,302,272 B2 * | 11/2007 | Ackley | 455/466 |
| 2002/0025799 A1 | 2/2002 | Takae et al. | |
| 2002/0029252 A1 | 3/2002 | Segan et al. | |
| 2002/0039479 A1 | 4/2002 | Watanabe et al. | |
| 2002/0082002 A1 | 6/2002 | Fujii | |
| 2002/0126820 A1 | 9/2002 | Barak et al. | |
| 2003/0017825 A1 | 1/2003 | De Loye et al. | |
| 2003/0076941 A1 | 4/2003 | Tiliks et al. | |
| 2003/0078979 A1 | 4/2003 | Sagi | |
| 2003/0100290 A1 | 5/2003 | McGregor et al. | |
| 2003/0139175 A1 | 7/2003 | Kim | |
| 2003/0144025 A1 | 7/2003 | Stenton | |
| 2003/0156696 A1 | 8/2003 | Brown et al. | |
| 2003/0189591 A1 | 10/2003 | Mo | |
| 2003/0224803 A1 | 12/2003 | Konno | |
| 2004/0082322 A1 | 4/2004 | Tani | |
| 2004/0103295 A1 | 5/2004 | Gustafsson | |
| 2004/0147255 A1 | 7/2004 | Lee | |
| 2004/0155969 A1 | 8/2004 | Hayashi | |
| 2004/0171376 A1 | 9/2004 | Engstrom et al. | |
| 2004/0180648 A1 | 9/2004 | Hymel et al. | |
| 2004/0198335 A1 | 10/2004 | Campen | |
| 2004/0203601 A1 | 10/2004 | Morriss et al. | |
| 2004/0208304 A1 | 10/2004 | Miller | |
| 2004/0228460 A1 | 11/2004 | Keramane | |
| 2004/0242216 A1 | 12/2004 | Boutsikakis | |
| 2005/0027794 A1 | 2/2005 | Decker | |
| 2005/0032510 A1 | 2/2005 | Ryu et al. | |
| 2005/0037732 A1 | 2/2005 | Kotzin | |
| 2005/0096009 A1 | 5/2005 | Ackley | |
| 2005/0099314 A1 | 5/2005 | Aisa | |
| 2005/0164687 A1 | 7/2005 | DiFazio | |
| 2005/0181808 A1 | 8/2005 | Vaudreuil | |
| 2005/0201362 A1 | 9/2005 | Klein et al. | |

* cited by examiner

| PHONE NUMBER (ALLOWED) | CALL DURATION FILTER | TIME OF DAY FILTER | | |
|---|---|---|---|---|
| | | | 340 | GENERAL PHONE SETTINGS |
| | | | | CURRENT DATE AND TIME |
| MOM | NO RESTRICTION | NO RESTRICTION | | CALENDAR EVENTS |
| | | | | TO DO LIST |
| DAD | NO RESTRICTION | NO RESTRICTION | 350 | COUNTDOWN TIMERS |
| JOHN | 60 MINUTES/MONTH | 7-9 P.M. | | INCOMING AND OUTGOING MESSAGING |
| LISA | 90 MINUTES/MONTH | 6-10 P.M. | | GAMES |
| ⋮ | ⋮ | ⋮ | | ⋮ |

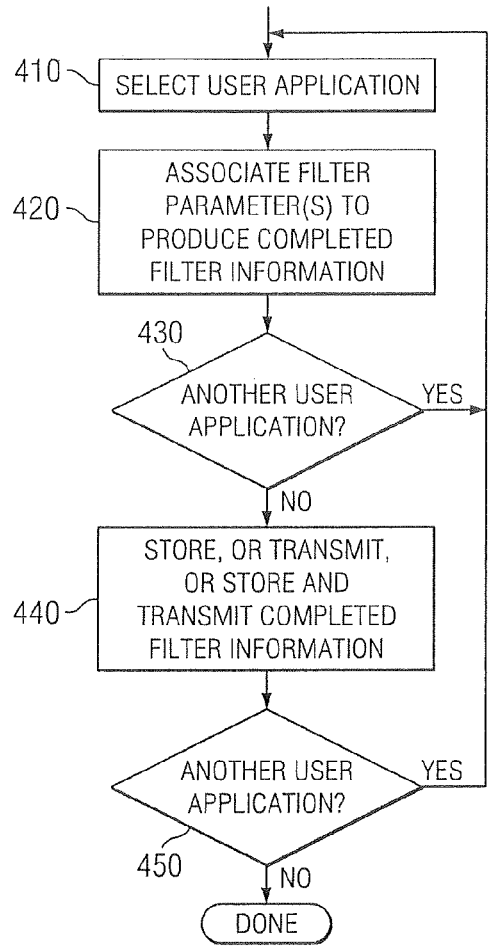
FIG. 4
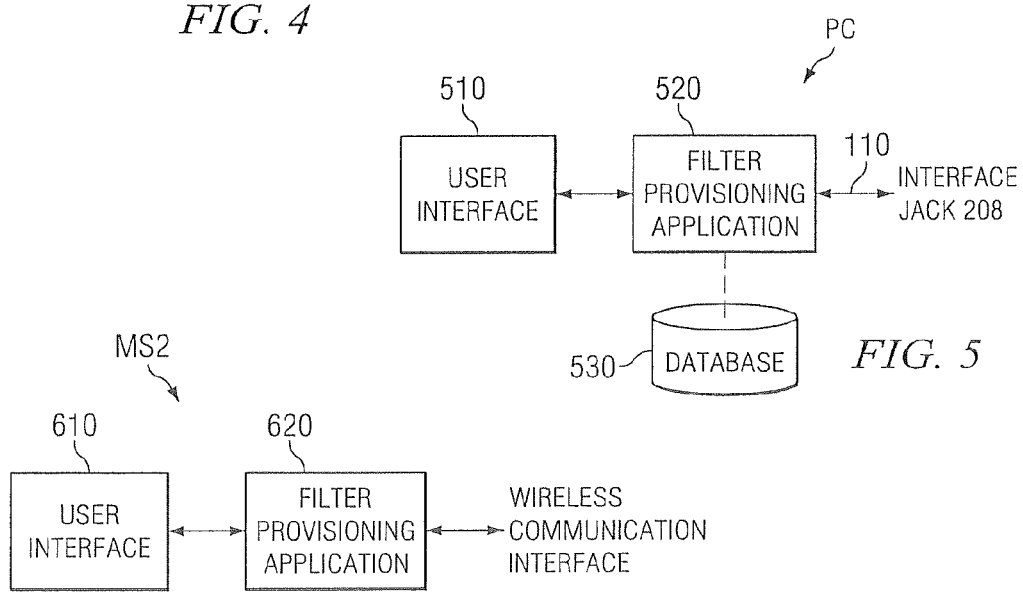
FIG. 5
FIG. 6

CONTROLLING THE USE OF A WIRELESS MOBILE COMMUNICATION DEVICE

PRIORITY CLAIM

This application is a continuation of prior application Ser. No. 10/962,158 filed on Oct. 8, 2004 now abandoned, which claims the priority under 35 U.S.C. §119(e) of U.S. Provisional Application No. 60/510,705, filed on Oct. 10, 2003 and incorporated herein by reference.

FIELD OF THE INVENTION

The invention relates generally to wireless mobile communication devices and, more particularly to controlling the use of a wireless mobile communication device.

BACKGROUND OF THE INVENTION

The usefulness and practicality of providing children with access to wireless mobile telecommunications technology is evident. Wireless communication devices such as mobile telephones are particularly useful and practical as a means of maintaining contact with children for purposes of safety, security and general peace of mind. However, although wireless telephones such as cell phones provide many obvious advantages for children, there are also several areas of concern. These areas of concern include the possibility of excessively large monthly telephone bills, unwanted callers, and general irresponsibility associated with children and young adults. This irresponsibility can manifest itself, for example, in excessive game playing on the wireless device, excessive time spent on telephone chats (whether or not they result in an increased bill), and poor management of the audible ringer function (for example, the phone rings in the middle of a child's math class).

It is therefore desirable to provide for parental control of the use of a wireless mobile communication device, such as a mobile telephone, that is made available by a parent to a child.

SUMMARY OF THE INVENTION

The present invention overcomes the limitations of the prior art and provides additional benefits. A brief summary of some embodiments and aspects of the invention are first presented. Some simplifications and omissions may be made in the following summary. The summary is intended to highlight and introduce some aspects of the disclosed embodiments, but not to limit the scope of the invention. The summary does not provide an exhaustive list of embodiments of the invention.

The present invention permits a controlling party to set limitations on a controlled party's access to applications operating on the controlled party's wireless mobile communication device. The controlling party can effectuate these limitations via various different mechanisms. For example, in some embodiments, the controlling party uses another wireless communication device to effectuate the limitations. In other embodiments, the limitations are effectuated by the controlling party operating a data processing apparatus connected by a wired data communication bus to the controlled party's wireless mobile communication device. In still further embodiments, the controlling party effectuates the limitations by accessing a website supported by a web server.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates exemplary filter provisioning operations according to the invention.

FIG. 5 diagrammatically illustrates a portion of FIG. 1 in more detail.

FIG. 6 diagrammatically illustrates a portion of FIG. 1 in more detail.

DETAILED DESCRIPTION OF THE INVENTION

FIGS. 1 through 13, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention.

Exemplary embodiments of the invention permit a controlling party, for example a parent, to set limitations on a controlled party's, for example a child's, access to and use of communication and other applications operating on the controlled party's wireless mobile communication device. The controlling party can effectuate these limitations via several different mechanisms, for example by using another wireless communication device, by operating a data processing apparatus connected by a wired data communication bus to the controlled party's wireless mobile communication device, or by accessing a website supported by a web server which can communicate with the controlled party's wireless mobile communication device.

Figure 1:
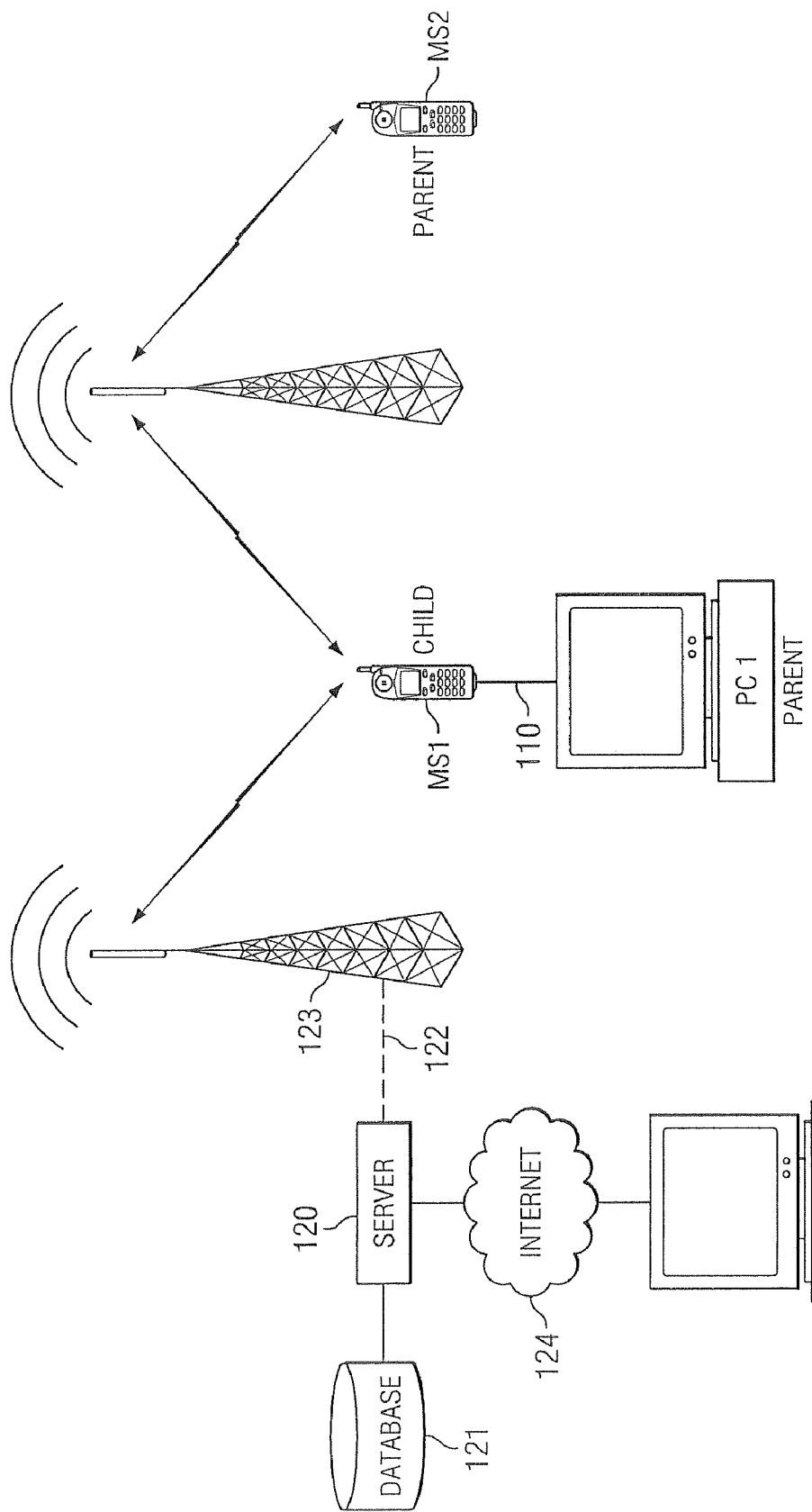
FIG. 1 diagrammatically illustrates exemplary embodiments of communication systems according to of the invention.

FIG. 1 diagrammatically illustrates exemplary embodiments of communication systems according to the invention. FIG. 1 illustrates a child's wireless mobile communication station MS1 (e.g., a phone, a PDA, a laptop computer, etc.) which supports various communication applications. A parent can limit the child's access to (or use of) these communication applications via three different control mechanisms according to the examples of FIG. 1. In one example, the parent can use another wireless communication station, for example the mobile wireless communication station MS2 to communicate the desired limitations to the child's communication device MS1. The actual wireless communication of the limitation information from MS2 to MS1 can be performed using conventional wireless communication techniques, for example the techniques described in the well known GSM/GPRS standards. Some embodiments use suitably customized text messaging to communicate the limitation information from MS2 to MS1.

In another example, the parent can communicate the desired limitation information to MS1 via a data processing apparatus connected to MS1 via a wired data communication bus 110, for example a Universal Serial Bus (USB) or an RS-232 bus. The data processing apparatus of FIG. 1, designated PC1, can be any data processing apparatus capable of data communication via the wired data communication bus 110. Examples of the data processing apparatus PC1 include a desktop computer, a laptop computer, a notebook computer, a personal digital assistant, etc.

In another example, the parent can communicate the desired limitation information to MS1 by using a suitable data processing apparatus PC2 to access, via a data network 124 (such as the internet), a web server 120 that supports a website (password protected in some embodiments) designed to process, store and transmit (to MS1) the limitation information. The server 120 includes a database 121 for storing the limitation information. In the example of FIG. 1, the server 120 utilizes conventional cellular infrastructure (shown by broken line at 122) to gain access to a conventional cellular base station 123. The base station 123 communicates with MS1 using any suitable conventional wireless communication techniques, for example the techniques defined in the GSM/GPRS standards. The limitation information provided by the parent to the server 120 can thus be communicated from the server 120 to the child's communication device MS1 via the cellular infrastructure 122 and the cellular base station 123. The data processing apparatus PC2 that the parent utilizes to access the web server 120 via the data network 124 can be any suitable data processing apparatus capable of data communication over a data network such as the internet. Examples of PC2 include a desktop computer, a laptop computer, a notebook computer, a personal digital assistant, etc.

Figures 2, 3:
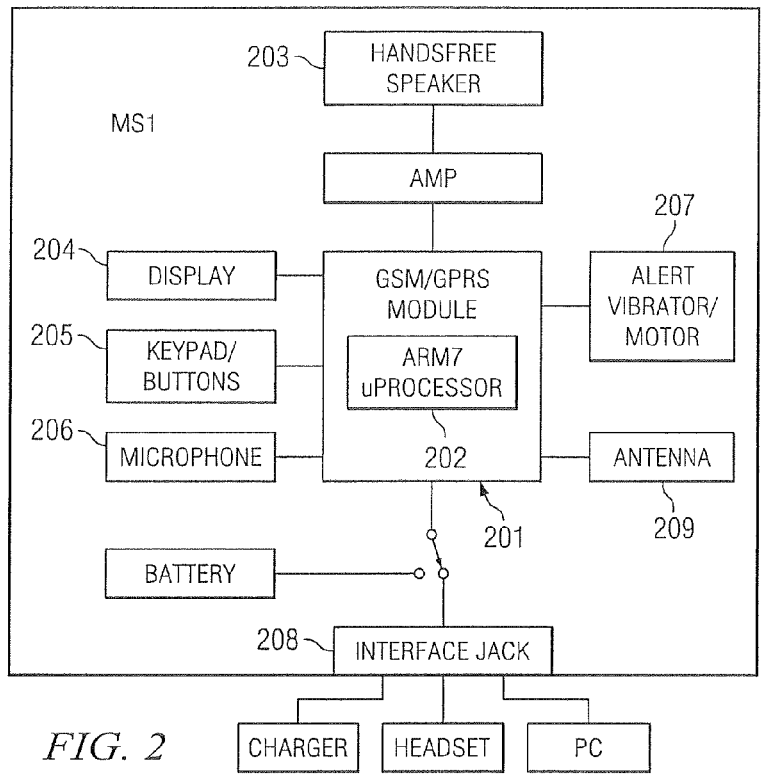
FIG. 2 diagrammatically illustrates a portion of FIG. 1 in more detail.
FIG. 3 illustrates exemplary communication applications and filter parameters according to the invention.

FIG. 2 illustrates in more detail an exemplary embodiment of the child's communication device MS1 of FIG. 1. In the example of FIG. 2, the communication device MS1 includes a GSM/GPRS module 201 that is provided with a data processing apparatus 202, for example a microprocessor, a microcontroller, or a digital signal processor. Various user interface components are coupled to the module 201. In the example of FIG. 2, these user interface components include a handsfree speaker 203, a visual display 204, a keypad and/or push button component 205, a microphone 206, an alert vibrator/motor 207 and an interface jack 208. The interface jack 208 can give the various illustrated external devices access to the module 201. In particular, the data processing apparatus PC1 of FIG. 1 can access the module 201 via the data communication bus 110 (see also FIG. 1) and the interface jack 208 of FIG. 2, thus permitting the data processor 202 to receive the controlling party's limitation information. The communication device MS1 also includes an antenna apparatus 209 coupled to the module 201 for supporting wireless communication according to the GSM/GPRS standards. Thus, the antenna apparatus 209 and the GSM/GPRS module 201 permit the data processor 202 to receive the controlling party's limitation information via the air interface.

In some embodiments, the data processor 202 of communication device MS1 implements the controlling party's limitations in the form of corresponding filtering functions. For example, if the controlling party places a limitation on the controlled party's use of a given application running on the data processor 202, then the data processor 202 implements that limitation in the form of a filter which filters input and/or output information associated with that application.

FIG. 3 illustrates examples of various applications and corresponding limitation information, or filter parameters, which filter parameters can be defined by the controlling party and transmitted to the controlled party's device MS1. FIG. 3 specifies filter parameters for a mobile telephony application by specifying at 310 telephone numbers (and corresponding parties) with which the controlled party is allowed to establish a telephone call. Separate lists of approved parties can be provided for incoming calls and outgoing calls. The filter parameters at 320 specify the call duration permitted for the various allowed parties specified at 310. The call duration parameter can be defined in any manner desired, for example, no restrictions, or restricted to a specified total amount of time per month, etc. The filter parameters at 330 specify a time of day filter corresponding to each of the permitted parties at 310. Thus, the controlled party can carry on telephone conversations with the various parties permitted at 310 only during the permitted times specified at 330. Considering one example of a filter defined by the filter parameters at 310, 320 and 330, and assuming, for example, that these filter parameters pertain to incoming calls, the controlled party can receive incoming calls from John (e.g., John's telephone number), but only during the hours of 7 to 9 p.m., and for no more than a total of 60 minutes in a month.

Referring still to the examples of FIG. 3, general phone settings are designated at 340. For example, the controlling party can specify at 340 the time period(s) during the day or night when MS1 will be on or off, the time period(s) during the day or night when MS1 will ring to announce an incoming call, the type of ring that will occur during specific time periods during the day or night, etc. One parameter at 340 can specify that the telephone would not ring during the hours that a child would have the device in school. This parameter may also specify that the vibration announcement is to be utilized instead of the audible ring during the time period that the child will be in school. Various exemplary applications normally available to the controlled party (user of MS1) are designated generally at 350. Limitations (filter parameters) can be programmed to permit or prevent (e.g., at all times or during selected time periods) the controlled party from accessing one or more of the applications at 350, namely the current date and time, the calendar of events, the to-do list, countdown timers, incoming and outgoing messaging, and games. Thus, the applications at 350 can have associated therewith filter parameters of the same general type shown at 330 in FIG. 3. Preventing access to the date and time application can, for example, prevent the controlled party from modifying the date and time in order to avoid the restrictions at 320 and/or 330. The countdown timer application could provide information such as, for example, "24 days and 6 hours until Dad's birthday". The rest of the exemplary applications illustrated at 350 are self-explanatory.

FIG. 4 illustrates exemplary filter provisioning operations which can be performed at the direction of the controlling party to impose limitations or filters on the available applications (also referred to as user applications) of the controlled party's communication device MS1. In some exemplary embodiments, the operations of FIG. 4 can be performed by the controlling party via any of the above-described mechanisms associated with MS2, PC1 and PC2 of FIG. 1. After selecting a given user application at 410, the desired filter parameter(s) can be associated to the selected user application at 420, thereby producing completed filter information for the currently selected user application. As indicated at 430, the operations at 410 and 420 can be repeated for as many user applications as desired before proceeding to 440. As illustrated at 440, and depending upon the particular embodiment, the completed filter information produced at 420 can be stored without transmitting it to MS1 at that time (for example, if MS1 is known to be turned off at that time), or it can be transmitted to MS1 without storing it, or it can be both stored and transmitted to MS1. Referring again to the operation at 430 above, it can be seen that the operations at 440 can be performed with respect to as many or as few user applications as desired. After the desired operation is performed at 440, the operations at 410, 420 and 440 can be performed with respect to another user application, as indicated generally at 450. The operations at 430 and 450 are thus provided to illustrate that the operation selected at 440 can, in various embodiments, be performed with respect to one user application at a time (for example when 430 is answered "no" and 450 is answered "yes"), or can be performed with respect to as many user applications as desired (for example when 430 is answered "yes").

FIG. 5 diagrammatically illustrates pertinent portions of exemplary embodiments of the data processing apparatus PC1 of FIG. 1. A user interface 510 (e.g., tactile, visual, etc.) provides a user with access to a filter provisioning application 520 running on a data processor. The filter provisioning application 520 receives from the user interface 510 controlling party input information indicative of selected user applications and corresponding filter parameters. The filter provisioning application 520 associates the user applications to the filter parameters to produce completed filter information (see also 420 of FIG. 4). The filter provisioning application 520 can then transmit the completed filter information to the controlled party's device MS1 via the wired data communication bus 110 (see also FIG. 1) and the interface jack 208 of MS1 (see also FIG. 2). In some embodiments, indicated by broken line in FIG. 5, the filter provisioning application 520 can also store the completed filter information in a database 530. In other embodiments, the filter provisioning application 520 can store the completed filter information in the database 530 without transmitting the completed filter information to MS1 at that time.

FIG. 6 diagrammatically illustrates pertinent portions of exemplary embodiments of a wireless communication device operated by the controlling party (such as MS2 in FIG. 1). A user interface 610 (e.g., tactile, visual, etc.) provides the controlling party with access to a filter provisioning application 620 running on a data processor. In response to controlling party input information indicative of selected applications and corresponding filter parameters, the filter provisioning application 620 associates the selected applications to the corresponding filter parameters to thereby produce completed filter information (see also 420 in FIG. 4). The filter provisioning application 620 then provides the completed filter information to a wireless communication interface for conventional wireless transmission of the completed filter information to the controlled party's device MS1. In some embodiments, the filter provisioning application 620 implements a conventional text messaging application to construct text messages that each include the aforementioned completed filter information.

Figure 7:
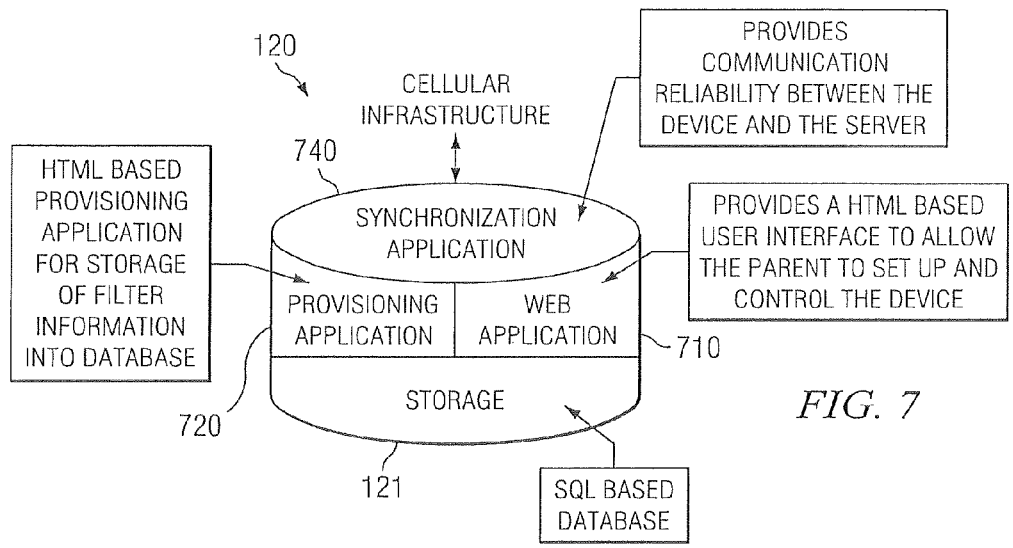
FIG. 7 diagrammatically illustrates a portion of FIG. 1 in more detail.

FIG. 7 diagrammatically illustrates pertinent portions of exemplary embodiments of the web server 120 of FIG. 1. As shown in FIG. 7, the server 120 implements a web application 710 which provides a HTML based user interface. The controlling party accesses the web application 710 via the data processing apparatus PC2 and the data network 124 (see also FIG. 1), and is thereby able to provide to a provisioning application 720 controlling party input information indicative of selected communication applications and corresponding filter parameters. The provisioning application 720 associates the communication applications to the corresponding filter parameters in order to produce completed filter information (see also 420 in FIG. 4). The provisioning application 720 can then provide the completed filter information to a synchronous application 740 which provides a communication interface (via the cellular infrastructure) toward the controlled party's device MS1. In some exemplary embodiments, the provisioning application 720 provides the completed filter information to the synchronization application 740 for transmission to MS1. In other exemplary embodiments, the provisioning application provides the completed filter information to the database 121 (see also FIG. 1) for storage, without providing the completed information to the synchronization application 740 for transmission to MS1. In further embodiments, the provisioning application 720 provides the completed filter information to the database 121 for storage therein, and also to the synchronization application 740 for transmission to MS1. In some exemplary embodiments, the applications at 710, 720 and 740 are JAVA (J2EE) based applications. In some exemplary embodiments, the database 121 is provided as an SQL-based database.

Figure 8:
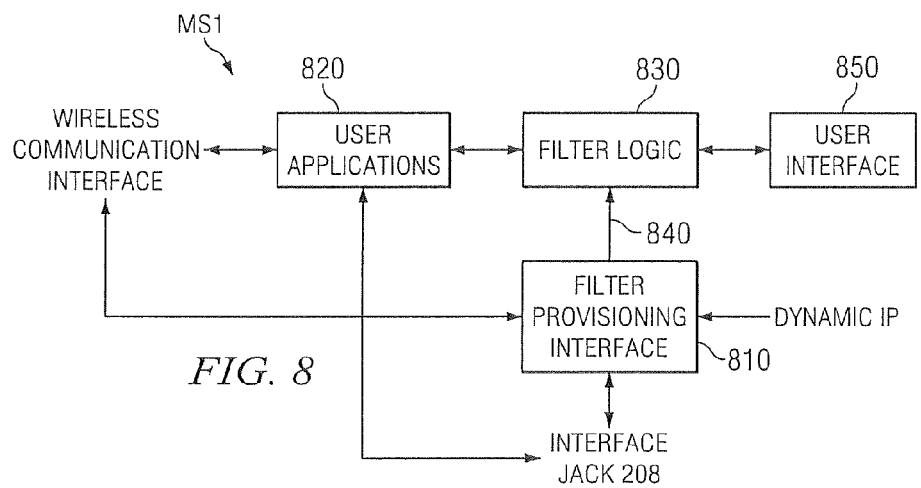
FIG. 8 diagrammatically illustrates a portion of FIGS. 1 and 2 in more detail.

FIG. 8 diagrammatically illustrates pertinent portions of exemplary embodiments of the controlled party's wireless mobile communication device MS1 of FIGS. 1 and 2. A filter provisioning interface application 810, running on the data processor 202, can receive input information from the controlling party via either the interface jack 208 of FIG. 2 or via a wireless communication interface (including antenna apparatus 209 of FIG. 2). The controlling party's input information includes the completed filter information for the communication (user) applications 820. The filter provisioning interface 810 provides the completed filter information at 840 to configure a filter logic application 830 running on the data processor 202. This filter logic implements the filters with respect to the user applications 820. The filter logic 830 is interposed in the data path between the user applications 820 and the user interface 850 (which can include for example, some, all or any combination of the user interface components described above relative to FIG. 2), and can thereby filter information provided by or intended for the user applications 820, thereby implementing the limitations embodied in the completed filter information 840. In the example of FIG. 8, some of the user applications 820 are coupled for communication with the wireless communication interface and others of the user applications 820 are coupled for communication with the interface jack 208.

Figure 9:
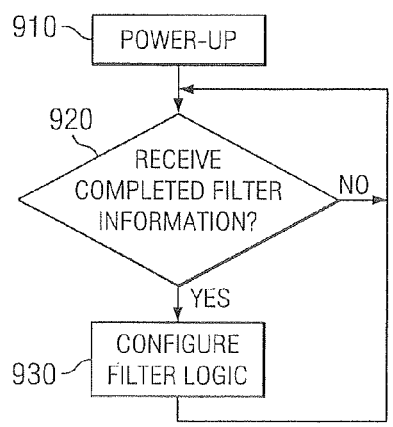
FIG. 9 illustrates exemplary filter configuration operations according to the invention.

FIG. 9 illustrates exemplary filter configuration operations which can be performed by the controlled party's wireless mobile communication device according to exemplary embodiments of the invention. The operations of FIG. 9 can be performed by the exemplary embodiments of FIG. 8. After power-up at 910, completed filter information is awaited at 920. After the completed filter information has been received from the controlling party at 920, the filter logic is configured at 930 to reflect the currently received completed filter information. After configuring the filter logic with the currently received completed filter information, the next completed filter information is awaited at 920.

Figure 10:
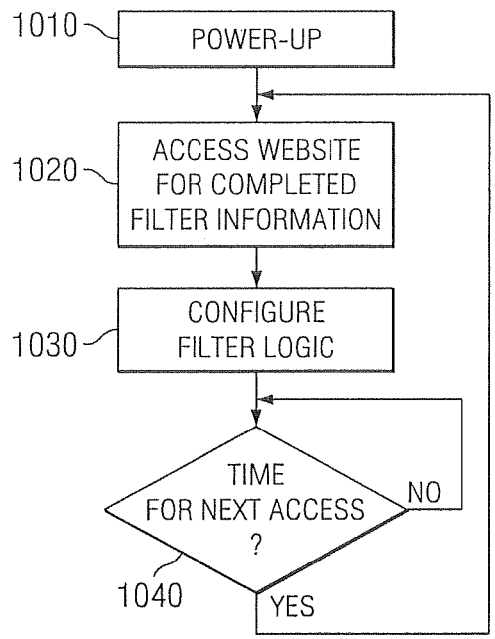
FIG. 10 illustrates further exemplary filter configuration operations according to the invention.

FIG. 10 illustrates further exemplary filter configuration operations which can be performed by the controlled party's wireless mobile communication station according to exemplary embodiments of the invention. The exemplary operations of FIG. 10 can be performed by the exemplary embodiments of FIG. 8. After power-up at 1010, the communication device accesses the web site on the web server (see also FIG. 1) to obtain the completed filter information as stored in the web server database. This is illustrated generally at 1020. After the completed filter information has been obtained at 1020, the filter logic is configured at 1030 to implement the newly obtained completed filter information. As illustrated generally at 1040, the website can be accessed periodically to obtain therefrom any new completed filter information. In some embodiments, the filter provisioning interface 810 of FIG. 8 uses conventional techniques to access the website of FIG. 7 (see also FIG. 1).

Figure 11:
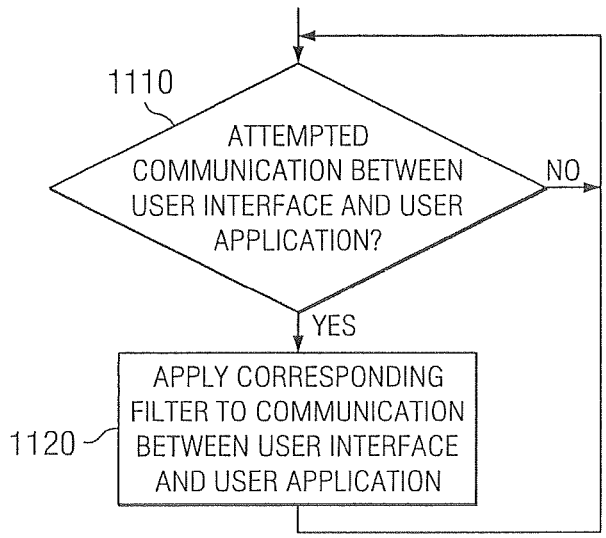
FIG. 11 illustrates exemplary filtering operations according to the invention.

FIG. 11 illustrates exemplary communication application filtering operations which can be performed according to the invention. The exemplary operations of FIG. 11 can be performed by the exemplary embodiments of FIG. 8. If an attempted communication between the user interface and a user application is detected at 1110, the corresponding filter is applied at 1120 with respect to communications between the user interface and that user application. Thereafter, the next attempted communication is awaited at 1110.

Referring again to FIGS. 1, 7 and 8, in GSM/GPRS embodiments, the GSM/GPRS operation utilizes a dynamic IP environment. Accordingly, in embodiments where the controlling party utilizes the web server 120 to access the controlled party's communication device MS1, the device MS1 utilizes a scheme to transmit the dynamic IP to the web server 120, so the web server 120 can maintain contact with the controlled party's device MS1. The filter provisioning interface 810 of FIG. 8 includes a dynamic LP input which receives information indicative of the dynamic IP. The filter provisioning interface 810 forwards this information to the web server 120 (see also FIG. 1) via the air interface and cellular infrastructure. The synchronization application 740 receives the updated dynamic IP information, and stores it in the database 121. In this manner, the web server can remain abreast of the changing IP environment of the controlled party's device MS1.

Figure 12:
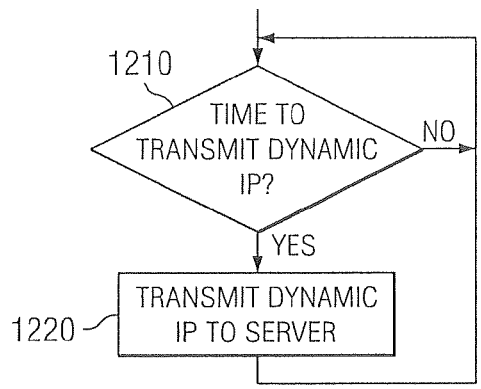
FIG. 12 illustrates exemplary dynamic IP update operations according to the invention.
Figure 13:
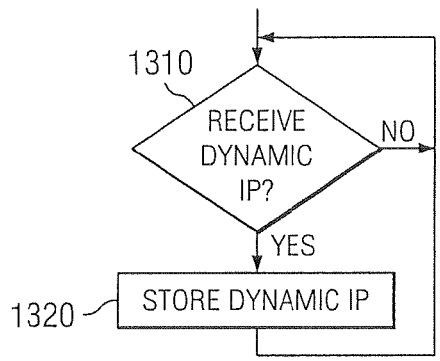
FIG. 13 illustrates further exemplary dynamic IP update operations according to the invention.

FIGS. 12 and 13 illustrate exemplary operations in support of the above-described dynamic LP update scheme. FIG. 12 illustrates exemplary operations which can be performed by the controlled party's device. It is first determined at 1210 whether or not it is time to transmit the dynamic IP information. For example, this can be done periodically, or whenever a change in the dynamic LP environment occurs. When it is determined at 1210 that it is time to transmit the dynamic IP information, this information is transmitted to the web server at 1220. Thereafter, operations return to 1210 to await the occurrence of the next occasion of transmitting dynamic IP.

FIG. 13 illustrates exemplary operations which can be performed by the synchronization application 740 of the web server of FIG. 7. At 1310, the synchronization application awaits the dynamic IP information update. When the dynamic IP information update has been received at 1310, the synchronization application then stores the dynamic IP information update at 1320. Thereafter, the synchronization application awaits the next dynamic EP update at 1310.

In some embodiments, the synchronization application 740 utilizes an acknowledgement verification protocol in order to confirm delivery of the completed filter information to the controlled party's device MS1. In such embodiments, the filter provisioning interface 810 of FIG. 8 transmits an acknowledgement to the synchronization application 740 upon receipt of the completed filter information. In various embodiments, the filter provisioning interface 810 provides acknowledgements to any of the sources (e.g., 120, PC1 and MS2 in FIG. 1) from which it receives completed filter information.

In some exemplary embodiments, the synchronization application 740 and the filter provisioning interface 810 utilize checksum verifications in conjunction with transmission of the completed filter information. In other exemplary embodiments, checksum verification is used in conjunction with transmission of the completed filter information from any of the sources of FIG. 1 to the controlled party's device MS1. In some embodiments, the aforementioned acknowledgement and checksum verification techniques are combined with respect to the transmission of the completed filter information to the controlled party's device.

In some embodiments which utilize the aforementioned acknowledgement protocol, the synchronization application 740 can implement a retry algorithm wherein the server attempts a predetermined number of retries in the absence of an acknowledgement, for example 3 retries, the first retry at 30 seconds after the initial transmission, the second retry at one minute after the initial transmission, and the third retry at 5 minutes after the initial transmission.

In some embodiments, the controlling party defines the filter operation such that the filter examines information associated with the user application and provides to the web server an update regarding the status of the examined information. For example, the filter operation can detect whether the controlled party is, via the user interface, removing a task from a "to-do" list, and the filter provisioning interface 810 can forward to the web server 120 a message indicating that this task of the "to-do" list has been completed. The controlling party can thus monitor the completion of activities by simply visiting the website on the server 120.

In some exemplary embodiments, the filter operation can be defined to perform an addition of an item to a given "to-do" list. For example, if the controlled party already has a list of things to do when she arrives home from school, the controlling party can add an item to that "to-do" list, for example "take out the dog when you get home".

In some exemplary embodiments, the identifier of the conventional, non-removable modem hardware in the module 201 of FIG. 2 is used instead of the removable SIM as the identification information for the controlled party's device MS1. This identification information is used to verify communication between the controlled party's device MS1 and the source from which the controlling party's completed filter information is received.

Although exemplary embodiments of the invention have been described above in detail, this does not limit the scope of the invention, which can be practiced in a variety of embodiments.

What is claimed is:

1. A web server remotely accessible by a controlling party device for controlling the use of a wireless mobile communication device, the web server comprising:
   a web interface for displaying a plurality of control filters for enabling a controlling party to input via the controlling party device filtering information for a plurality of communication capabilities and user applications on the wireless mobile communication device, the filtering information including first information identifying a first remote communication device with which the wireless mobile communication device may communicate without restriction, second information identifying a second remote communication device with which the wireless mobile communication device may communicate with one or more restrictions, and third information for controlling use of another one of the user applications;
   a data processor having an input coupled to said web interface, said data processor for processing said first, second and third information for transmission to the wireless mobile communication device;
   an output coupled to said data processor for outputting said first, second and third information for transmission to the wireless mobile communication device; and
   a database for storing IP information of the wireless mobile communication device received from the wireless mobile communication device, the IP information operable for enabling the web server to communicate with the wireless mobile communication device.

2. The web server of claim 1, wherein said first, second and third information is transmitted to the wireless mobile communication device via, first, a wired data network and, second, a wireless communication channel.

3. The web server of claim 1, wherein said data processor supports a text messaging application for providing said first, second and third information in a text message.

4. The web server of claim 1, wherein said web server is accessible through the Internet.

5. The web server of claim 1, wherein said wireless mobile communication device is provided as one of a telephone, a personal digital assistant, and a portable computer, each equipped for wireless communication.

6. The web server of claim 1 wherein the first and second information comprise telephone numbers of the first and second remote communication devices, respectively.

7. The web server of claim 1 wherein the first information identifies a first group of remote communication devices in a first list and the second information identifies a second group of remote communication devices in a second list.

8. The web server of claim 1 wherein the one or more restrictions includes a time of day restriction.

9. The web server of claim 1 wherein the one or more restrictions includes a call duration restriction.

10. The web server of claim 1 wherein the other user application is a data and time application.

11. The web server of claim 1 wherein the web server receives the IP information from the wireless mobile communication device at least a one of: periodically or when the IP information of the wireless mobile communication device changes.

12. A method of controlling the use of a wireless mobile communication apparatus, comprising:
   providing a web configuration interface from a web server to a remote controlling party device, the web configuration interface operable for receiving filtering information from the remote controlling party device for a plurality of communication capabilities and user applications on the wireless mobile communication device, the filtering information including first information identifying a first remote communication device with which the wireless mobile communication apparatus may communicate without restriction, second information identifying a second remote communication device with which the wireless mobile communication apparatus may communicate with one or more restrictions, and third information for controlling use of another one of the user applications;
   transmitting the first, second and third information from the web configuration interface to a wireless mobile communication network;
   in response to receipt of the first, second and third information at the wireless mobile communication network, transferring the first, second and third information to the wireless mobile communication apparatus;
   in response to receipt of the first, second and third information at the wireless mobile communication apparatus, allowing or restricting communication with the first and second remote communication devices in accordance with the first and second information, respectively, and controlling the other user application in accordance with said third information.
   receiving, at the web server, IP information from the wireless mobile communication apparatus, the IP information operable for enabling the web server to communicate with the wireless mobile communication apparatus.

13. The method of claim 12, wherein said transmitting step includes transmitting the first, second and third information through the worldwide web.

14. The method of claim 12, wherein said transmitting step includes transmitting the first, second and third information across a data communication network.

15. The method of claim 12, wherein said transmitting step includes transmitting the first, second and third information on a wired communication channel, and said transferring step includes transmitting the first, second and third information on a wireless communication channel.

16. The method of claim 15, wherein the first, second and third information is stored on the web server prior to being transferred on the wireless communication channel.

17. The method of claim 12, wherein said third information determines the user's ability to access the other user application during selected times or under selected conditions.

18. The method of claim 17, including transmitting from the wireless mobile communication apparatus to the web configuration interface an indication that a user has accessed the user application.

19. The method of claim 12 wherein the first and second information comprise telephone numbers of the first and second remote communication devices, respectively.

20. The method of claim 12 wherein the first information identifies a first group of remote communication devices in a first list and the second information identifies a second group of remote communication devices in a second list.

21. The method of claim 12 wherein the one or more restrictions includes at least one of a time of day restriction and a call duration restriction.

22. The method of claim 12 wherein the other user application is a data and time application.

23. The method of claim 12 wherein the first and second information comprise telephone numbers of the first and second remote communication devices, respectively, and the one or more restrictions includes a one of an incoming restriction and an outgoing restriction.

24. The method of claim 12 wherein receiving, at the web server, IP information from the wireless mobile communication apparatus comprises at least a one of: receiving the IP information periodically or receiving the IP information when the IP information of the wireless mobile device changes.

25. A web server remotely accessible by a controlling party device for controlling the use of a wireless mobile communication device, the web server comprising:
a web interface for displaying a plurality of control filters for enabling a controlling party to input via the controlling party device a first telephone number identifying a first remote communication device with which the wireless mobile communication device may communicate without restriction, a second telephone number identifying a second remote communication device with which the wireless mobile communication device may communicate with one or more restrictions, and predetermined information for controlling use of a user application available on the wireless mobile communication device, the user application different from a phone application;
a data processor having an input coupled to the web interface, the data processor for processing the first and second telephone numbers and the predetermined information for transmission to the wireless mobile communication device;
an output coupled to the data processor for outputting the first and second telephone numbers and the predetermined information for transmission to the wireless mobile communication device; and
a database for storing IP information of the wireless mobile communication device received from the wireless mobile communication device, the IP information operable for enabling the web server to communicate with the wireless mobile communication device.

26. The web server of claim 25 wherein the web server receives the IP information from the wireless mobile communication device at least a one of: periodically or when the IP information of the wireless mobile communication device changes.

27. A method of controlling the use of a wireless mobile communication apparatus, comprising:
providing a web configuration interface from a web server to a remote controlling party device, the web configuration interface operable for receiving via the remote controlling party device a first telephone number identifying a first remote communication device with which the wireless mobile communication apparatus may communicate without restriction, a second telephone number identifying a second remote communication device with which the wireless mobile communication apparatus may communicate with one or more restrictions, and predetermined information for controlling use of a user application available on the wireless mobile communication device, the user application different than a phone application;
transmitting the first and second telephone numbers and the predetermined information from the web configuration interface to a wireless mobile communication network;
in response to receipt of the first and second telephone numbers and the predetermined information at the wireless mobile communication network, transferring the first and second telephone numbers and the predetermined information to the wireless mobile communication apparatus;
in response to receipt of the first and second telephone numbers and the predetermined information at the wireless mobile communication apparatus, allowing or restricting communication with the first and second remote communication devices, respectively, and controlling the user application in accordance with the predetermined information; and
receiving, at the web server, IP information from the wireless mobile communication apparatus, the IP information operable for enabling the web server to communicate with the wireless mobile communication apparatus.

28. The method of claim 27 wherein receiving, at the web server, IP information from the wireless mobile communication apparatus comprises at least a one of: receiving the IP information periodically or receiving the IP information when the IP information of the wireless mobile device changes.

* * * * *